US008629584B2

(12) United States Patent
Smirnov et al.

(10) Patent No.: US 8,629,584 B2
(45) Date of Patent: Jan. 14, 2014

(54) BASE ASSEMBLY FOR MOTOR AND FAN MOTOR INCLUDING THE SAME

(75) Inventors: Viatcheslav Smirnov, Gyunggi-do (KR); Duck Shik Kim, Gyunggi-do (KR); Chang Keun Jun, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 55 days.

(21) Appl. No.: 13/403,514

(22) Filed: Feb. 23, 2012

(65) Prior Publication Data
US 2013/0106224 A1 May 2, 2013

(30) Foreign Application Priority Data
Nov. 2, 2011 (KR) ........................ 10-2011-0113361

(51) Int. Cl.
*H02K 5/24* (2006.01)

(52) U.S. Cl.
USPC ............................................. 310/51; 310/90

(58) Field of Classification Search
USPC ................................. 310/90, 51, 89
See application file for complete search history.

(56) References Cited

U.S. PATENT DOCUMENTS

| 6,356,408 | B1 * | 3/2002 | Nii et al. .................... 360/98.07 |
| 7,750,520 | B2 * | 7/2010 | Smirnov et al. ................. 310/90 |
| 7,915,774 | B2 * | 3/2011 | Lee ................................. 310/90 |
| 7,923,876 | B2 * | 4/2011 | Smirnov et al. ................. 310/90 |
| 8,330,310 | B2 * | 12/2012 | Kim ............................... 310/90 |
| 2005/0184609 | A1 | 8/2005 | Chen et al. |
| 2005/0210490 | A1 * | 9/2005 | Shimizu et al. ............... 720/697 |
| 2006/0255674 | A1 | 11/2006 | Chen et al. |
| 2007/0132326 | A1 * | 6/2007 | Kim et al. ....................... 310/90 |
| 2007/0140604 | A1 | 6/2007 | Shishido et al. |
| 2007/0188034 | A1 | 8/2007 | Yoshida |
| 2007/0290571 | A1 * | 12/2007 | Yoon ............................. 310/261 |
| 2008/0224554 | A1 | 9/2008 | Hiwa et al. |

FOREIGN PATENT DOCUMENTS

JP 2004-007965 1/2004
KR 10-2006-0043015 5/2006

* cited by examiner

Primary Examiner — Nguyen N Hanh
(74) Attorney, Agent, or Firm — McDermott Will & Emery LLP

(57) ABSTRACT

There are provided a base assembly for a motor and a fan motor including the same. The base assembly includes; a holder including a shaft system of the motor mounted therein and a stator for providing rotational driving force to a rotating member; an extension member mounted on the holder and extended to an upper portion of the stator; and an attractive magnet positioned above the extension member in an outer diameter direction to thereby prevent excessive floating of the rotating member.

13 Claims, 4 Drawing Sheets

BASE ASSEMBLY FOR MOTOR AND FAN MOTOR INCLUDING THE SAME

CROSS-REFERENCE TO RELATED APPLICATIONS

This application claims the priority of Korean Patent Application No. 10-2011-0113361 filed on Nov. 2, 2011, in the Korean Intellectual Property Office, the disclosure of which is incorporated herein by reference.

BACKGROUND OF THE INVENTION

1. Field of the Invention

The present invention relates to a base assembly for a motor and a fan motor including the same.

2. Description of the Related Art

Recently, small portable computers such as a notebook computer, or the like, have tended to have excellent performance, to be relatively slim, and to be light weight. For the miniaturization and thinness of these electronic products, it is necessary to miniaturize a central processing unit (CPU) and peripheral electronic devices used therein and to increase the speed and capacity thereof.

As described above, in accordance with a relative increase in the capacity of electronic components such as the CPU, or the like, miniaturized as described above, a heat generation amount has significantly increased. In order to prevent electronic components from overheating, a more rapid and effective cooling unit should be provided.

However, as electronic products have gradually been thinned, the density thereof can only be further increased in an internal space of the electronic product. Due to this spatial limitation, a cooling fluid (air) may not flow smoothly, such that it may be difficult to discharge heat generated from an electronic chip.

Particularly, since the CPU generates relatively greater heat as compared to other components, a defect due to an increase in temperature of the CPU is serious. That is, the increase in temperature of the CPU causes a reduction in clock speed, an error, and a rapid increase in a fault generation rate.

Currently, research into a method for effectively dissipating heat from heated element such as a CPU, or the like, has been actively conducted. In an attempt thereto, according to the related art, a cooling device such as a fan motor, a heat radiating pin, a heat pipe, or the like, may be attached to a processor to cool the processor or a high heat generating component, or the like.

When the fan motor rotates at a high speed, stable rotation of a fan driven by the fan motor is required, which in turn requires stable rotation of a rotor. In order to solve this technical defect, various attempts have been undertaken.

SUMMARY OF THE INVENTION

An aspect of the present invention provides a fan motor in which a rotor may stably rotate even in a case in which the fan motor rotates at a high speed.

According to an aspect of the present invention, there is provided a base assembly for a motor, the base assembly including; a holder including a shaft system of the motor mounted therein and a stator for providing rotational driving force to a rotating member; an extension member mounted on the holder and extended to an upper portion of the stator; and an attractive magnet positioned above the extension member in an outer diameter direction to thereby prevent excessive floating of the rotating member.

The extension member may have a significantly reduced interval between the extension member and a lower surface of the rotating member.

The extension member may have an interval between the extension member and the lower surface of the rotating member, the interval forming a labyrinth seal.

The extension member may be provided with at least one ring shaped groove in a portion in which the extension member faces the rotating member.

The rotating member may be provided with at least one ring shaped groove in a portion in which the rotating member faces the extension member.

The extension member may include the attractive magnet seated on a downwardly stepped portion of an outer edge thereof.

The outer edge of the extension member may have a shape in which only an upper portion thereof corresponding to a portion at which the attractive magnet faces the rotating member is opened.

The extension member may be formed of a magnetic material.

The extension member may include a yoke provided on the outer edge thereof, the yoke having the attractive magnet seated thereon.

The yoke may be formed of the magnetic material.

The extension member may be fixed to an outer portion of an upper edge of the holder.

The extension member may have a fixing part formed by bending the internal edge thereof to be fixed to an internal portion of an upper edge of the holder.

According to another aspect of the present invention, there is provided a fan motor including: the base assembly as described above; a shaft system of the motor including a bearing, a washer, and a shaft mounted in the base assembly; a rotating member including a rotor fixed to an upper end of the shaft and provided to rotate; and a fan mounted on an outer portion of the rotor.

The fan motor may further include a housing including the base assembly fixed to an internal portion thereof and the shaft system and the rotating member operated in the internal portion thereof.

The housing may include communication parts provided at upper and lower portions thereof in an axial direction so that a cooling air current passes from one end thereof to the other end thereof by rotation of the spindle motor, wherein the communication parts are in communication with the outside.

The communication part at the lower portion of the housing may be provided along an outer diameter of the base assembly and the communication part at the upper portion of the housing may have a shape in which it is opened.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
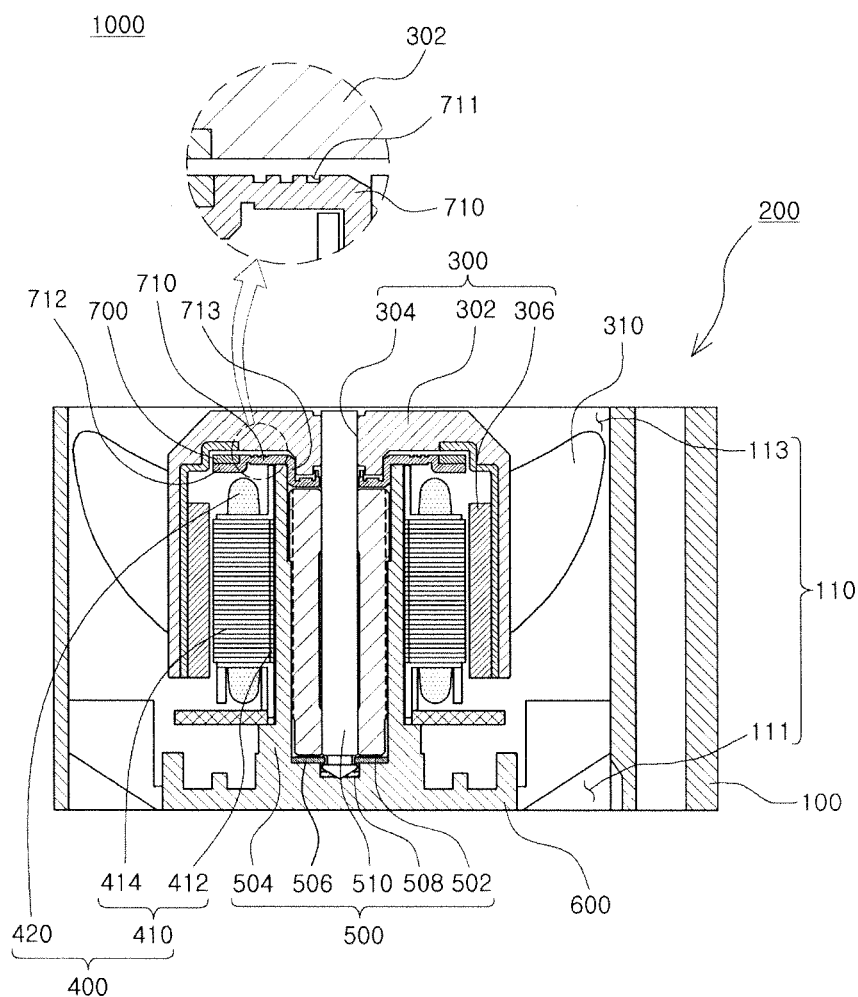
FIG. 1 is a schematic cross-sectional view of a fan motor according to an embodiment of the present invention.

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

Further, like reference numerals will be used to designate like components having similar functions throughout the drawings within the scope of the present invention.

Figure 2:
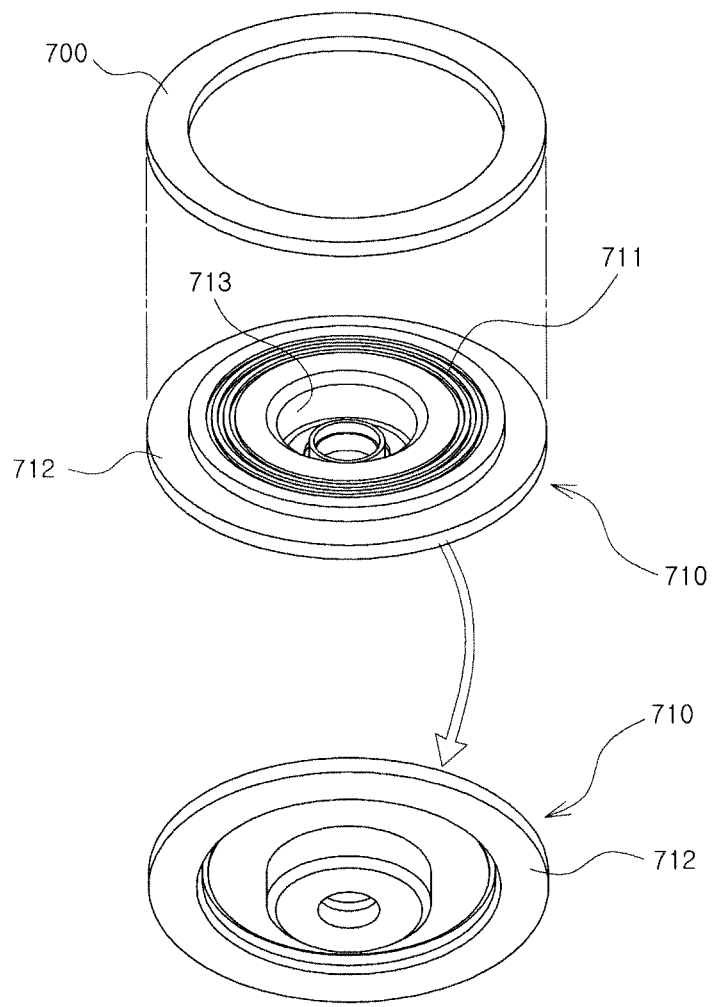
FIG. 2 is an exploded perspective view showing a form in which an attractive magnet is mounted on an extension member in the fan motor according to the embodiment of the present invention.

FIG. 1 is a schematic cross-sectional view of a fan motor according to an embodiment of the present invention; and FIG. 2 is an exploded perspective view showing a form in which an attractive magnet is mounted on an extension member in the fan motor according to the embodiment of the present invention.

Referring to FIGS. 1 and 2, the fan motor 1000 according to the embodiment of the present invention may include a spindle motor 200. The fan motor 1000 may include a housing 100 having the spindle motor 200 provided therein and a fan 310 mounted on a rotor 300 of the spindle motor 200.

Terms with respect to directions will be first defined. As viewed in FIG. 1, an axial direction refers to a vertical direction based on a shaft 500, and an outer diameter or internal diameter direction refers to a direction towards an outer edge of the rotor 300 based on the shaft 500 or a direction towards the center of the shaft 500 based on the outer edge of the rotor 300.

In addition, a circumferential direction refers to a direction in which the rotor 300 rotates based on the shaft 500.

The housing 100 is a member having a spindle motor to be described below mounted therein and attached to an electronic device. The housing 100 may generally have a box shape or a cylindrical shape. In addition, since a cooling air current may need to pass from one end of the housing 100 to the other end thereof by rotation of the spindle motor 200, the housing 100 may include communication parts 110 provided at upper and lower portions thereof in the axial direction of the spindle motor 200, the communication parts 110 being in communication with the outside. Meanwhile, the communication part at the lower portion of the housing 111 may be provided along an outer diameter of the base assembly and the communication part at the upper portion of the housing 113 may have a shape in which it is opened.

Here, the base assembly may be a component including a member fixed to a base. Particularly, the base assembly may include any component including a fixed member except for a rotating member.

The spindle motor 200 may include the rotor 300 having a driving magnet 306 coupled thereto, the shaft 500 coupled to the rotor 300, a bearing 502 rotatably supporting the shaft 500, a holder 504 supporting the bearing 502, a stator 400 coupled to an outer peripheral surface of the holder 504 to be adjacent to the driving magnet 306, and an attractive magnet 700 facing the rotor 300 and coupled to an upper portion of an outer edge of the stator 400, to thereby provide attractive force to the entire rotor 300 in a stator 400 direction, whereby stable rotation of the rotor 300 may be secured to prevent noise or power waste that may be generated at the time of high speed rotation. Here, the magnet 700 may have an annular shape and be provided in the circumferential direction along an outer diameter of the stator 400.

Meanwhile, the magnet 700 may be provided on an extension member 710 mounted on the holder 504 and extended to an upper portion of the stator 400. More specifically, the magnet 700 may be positioned above the extension member 710 in the outer diameter direction. An internal edge of the extension member 710 may be fixed to an internal portion of an upper edge of the holder 504. To this end, the extension member 710 has an internal fixing part 713 formed by bending the internal edge thereof to thereby be fixed to the internal portion of an upper edge of the holder 504 by a method such as a press-fitting method, an adhesive coupling method, or the like.

An outer edge of the extension member 710 may have a shape in which only an upper portion thereof corresponding to a portion at which the attractive magnet 700 face the rotating member is opened. That is, only the upper portion of the extension member 710 may face the rotating member, whereby efficiency of the attractive magnet 700 may be significantly increased. Here, the extension member 710 may be formed of a magnetic material to thereby serve as a yoke.

Meanwhile, the extension member 710 may include a yoke (712) separately provided on the outer edge thereof, wherein the yoke has the attractive magnet 700 seated thereon and is formed of a magnetic material.

Here, the extension member 710 may have a significantly reduced interval between the extension member 710 and a lower surface of the rotating member. That is, the extension member 710 may have a significantly reduced interval between the extension member 710 and a rotor case 302 among components of the rotor 300, which is one of the rotating members. In this case, the interval between the extension member 710 and the rotor case 302 may be provided as an interval in which a labyrinth seal is formed.

Since the extension member 710 is a fixed member and the rotor case 302 adjacent thereto is a rotating member, when the rotor case 302 rotates in a state in which the interval between the extension member 710 and the rotor case 302 is significantly reduced, attractive force attracting the rotor case 302 toward the extension member 710 may be generated.

Further, at least one of the extension member 710 and the rotor case 302 may be provided with at least one ring shaped groove 711 in a portion in which the extension member 710 faces the rotor case 302, which is the rotating member. In this case, when the rotor case 302 rotates, larger attractive force attracting the rotor case 302 toward the extension member 710 may be generated. Although not shown, the ring shaped groove may be provided in a lower surface of the rotating member (the rotor case) facing the extension member 710.

In addition, a portion at which the extension member 710 faces the rotor case 302 provided as the rotating member, may be provided with at least one pumping groove. The pumping groove may have a shape such as a spiral shape, a screw shape, a herringbone shape, or the like. Although not shown, the pumping groove maybe formed in the lower surface of the rotating member (the rotor case) facing the extension member 710.

The rotor 300 may include the rotor case 302 and the driving magnet 306. The rotor case 302 may include a burring part formed at an upper portion thereof, wherein the burring part is coupled to the shaft 500. The burring part 304 may have a through-hole formed at the center thereof and be formed to protrude upwardly. That is, the burring part 304 may have the shaft 500 coupled to an internal peripheral surface thereof. Meanwhile, the rotor case 302 may be formed of a magnetic material such as iron.

The rotor case 302 may have a downwardly protruded outer edge and have the driving magnet 306 coupled to an internal peripheral surface thereof. The driving magnet 306 may generate driving force by electromagnetic action with the stator 400 to rotate the rotor 300.

The shaft 500 may have one side inserted into the burring part 304 of the rotor case 302 to thereby be coupled to the burring part 304 and the other side rotatably supported by the bearing 502. The bearing 502 may be formed of a sintered body and an oil containing bearing in which a lubricating oil is impregnated in the sintered body. The bearing 502 is not limited thereto, but may be provided by various bearings.

The bearing 502 may have a predetermined clearance between the bearing 502 and the shaft 500. When the shaft 500 rotates, the lubricating fluid impregnated in the sintered body may fill the clearance, such that the shaft 500 may smoothly rotate.

The holder 504 may support the bearing 502. The holder 504 may include a through-hole formed at the center thereof, and the bearing 502 may be inserted into the through-hole, such that the bearing 502 may be supported. An outer peripheral surface of the holder 504 may be coupled to an internal peripheral surface of the stator 400 while contacting the internal peripheral surface of the stator 400.

A bearing 508 may be coupled to the through-hole of the holder 504 to thereby support the shaft 500 in the vertical direction. The bearing 508 and a lower surface of the shaft 500 may include a washer 506 interposed therebetween to thereby prevent separations of the shaft 500 and prevent friction between the bearing 508 and the shaft 500.

The holder 504 maybe fixed to the base member 600. The holder 504 may support the shaft at an internal portion thereof and support the stator 400 at an outer portion thereof. As a result, the holder 504 may fix the shaft 500 and the stator 400 to the base plate 600.

Meanwhile, the holder 504 may be formed integrally with the base member 600 or be provided as a separate member and be coupled to the base member 600.

The stator 400 may include a stator core 410 and a coil 420. The stator core 410 may include an annular body 412 and a plurality of teeth 414 extended from the body 412 to the outside, wherein the teeth 414 may have the coil 420 wound therearound. A distal end of the teeth 414 may face the driving magnet 306.

Meanwhile, a printed circuit board (not shown) may be coupled to the base member 600 to thereby provide electrical connection to the coil 420 wound around the stator core 410.

In addition, as shown in FIGS. 1 and 2, the attractive magnet 700 according to the embodiment of the present invention may be provided on the upper portion of the outer edge of the stator 400. The attractive magnet 700 may be provided on the outer edge of the stator 400 to prevent excessive floating of the rotor 300, whereby efficiency of the attractive magnet 700 maybe significantly increased. That is, the attractive magnet 700 maybe provided at a position that is as distant as possible from the shaft 500 provided as the rotation center, in the outer diameter direction, whereby attractive force may be significantly increased.

According to the related art, a structure in which the annular attractive magnet is provided on the upper portion of the internal edge of the stator to allow attractive force to uniformly act in the circumferential direction between the attractive magnet and the rotor, thereby preventing excessive floating of the rotor, has been used. In the case of this structure, vibration or noise is generated in the rotor even in small external force, such that the motor is not accurately operated. Therefore, the embodiments of the present invention may be provided to reduce the vibration and the noise of the motor by intentionally applying deflection force to the rotor. Here, the attractive magnet 700 may be a permanent magnet.

Meanwhile, the attractive magnet 700 may be mounted on the extension member 710 mounted on the holder 504 and extended to the upper portion of the stator 400. The extension member 710 may have a significantly reduced interval between the extension member 710 and the lower surface of the rotating member (the rotor case 302) and generate force downwardly attracting the rotating member separately from the attractive magnet 700. Further, in a case in which at least one of the extension member 710 and the rotating member (the rotor case 320) includes at least one ring shaped groove 711 in a portion in which the extension member 710 faces the rotating member (the rotor case 302), larger force downwardly attracting the rotating member may be generated separately from the attractive magnet 700.

Meanwhile, according to the embodiment of the present invention, a shaft system of the motor, which indicates a portion providing a structure in which the shaft 500 is rotatably coupled to the base member 600 to thereby rotate, may include the bearing 502, the holder 504, and the shaft 500.

In addition, according to the embodiment of the present invention, the fixed member may include the base member 600, the bearing 502, the holder 504, the washer 502, the bearing 508, and the stator 400, and the rotating member, a relatively rotating member with respect to the fixed member, may include the shaft 500 and the rotor 300.

Figure 3:
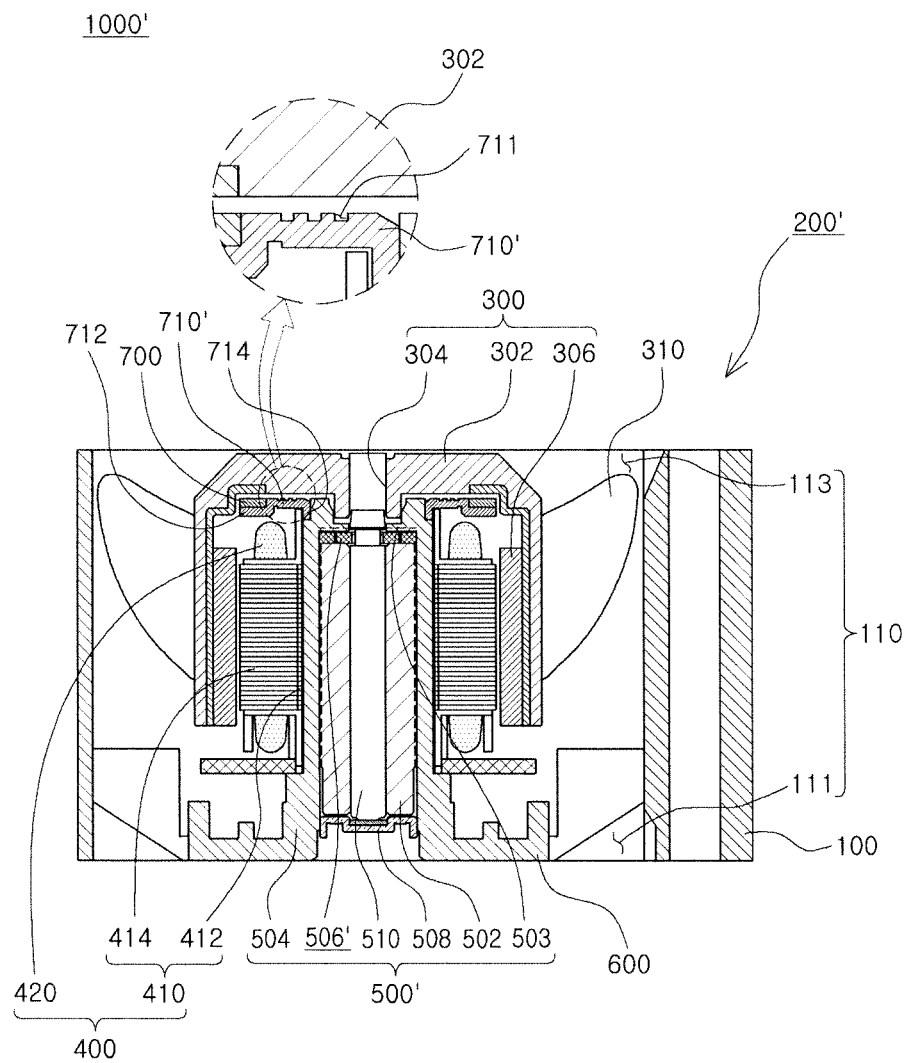
FIG. 3 is a schematic cross-sectional view of a fan motor according to another embodiment of the present invention.
Figure 4:
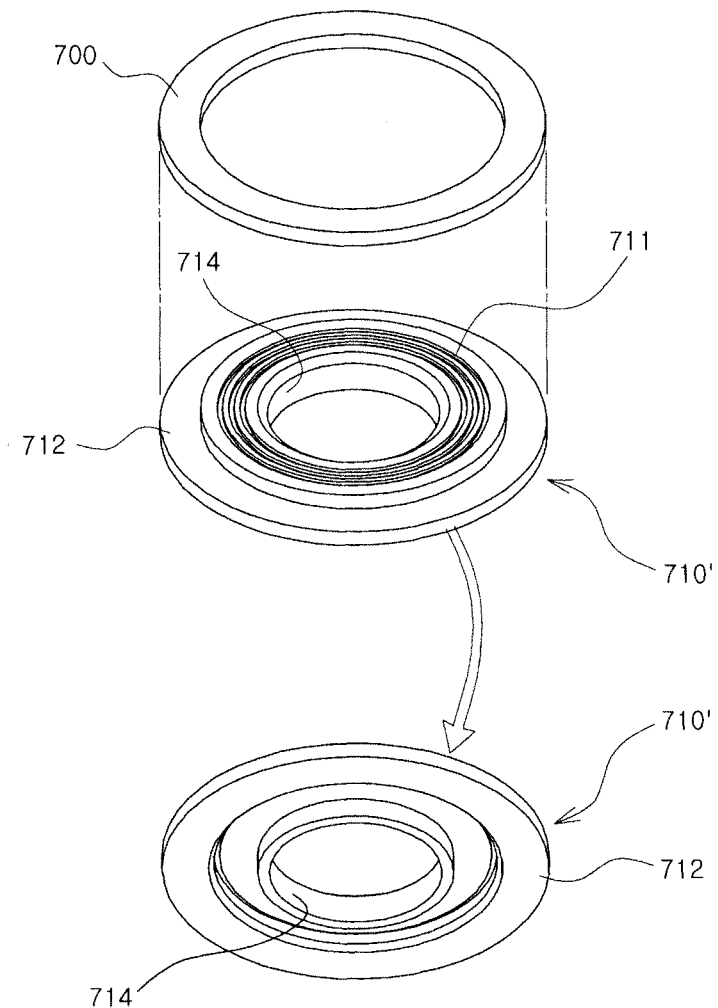
FIG. 4 is an exploded perspective view showing a form in which an attractive magnet is mounted on an extension member in the fan motor according to another embodiment of the present invention.

FIG. 3 is a schematic cross-sectional view of a fan motor according to another embodiment of the present invention; and FIG. 4 is an exploded perspective view showing a form in which an attractive magnet is mounted on an extension member in the fan motor according to another embodiment of the present invention.

Referring to FIGS. 3 and 4, the fan motor 1000' according to another embodiment of the present invention may include a spindle motor 200'. The fan motor 1000' may include a housing 100 having the spindle motor 200' provided therein and a fan 310 mounted on a rotor 300 of the spindle motor 200'.

The fan motor 1000' according to another embodiment of the present invention has substantially the same configuration as that of the fan motor 1000 according to the embodiment of the present invention, except for a shape of an extension member 710' having an attractive magnet 700 mounted thereon and a position of a washer 506' preventing excessive floating of a rotating member. Therefore, a description of the same configuration as that of the fan motor 1000 according to the embodiment of the present invention will be omitted.

In the fan motor 1000' according to another embodiment of the present invention, the magnet 700 may be provided on the extension member 710' mounted on an outer portion of an upper edge of the holder 504 and extended to an upper portion of the stator 400. More specifically, the magnet 700 may be positioned above the extension member 710' in the outer diameter direction. Therefore, an internal edge of the extension member 710' may have an outer fixing part mounted on an outer portion of the holder 504. The outer fixing part 714 may have a shape in which it is bent downwardly or upwardly to be easily fixed to the holder 504.

An internal edge of the extension member 710' may be fixed to an outer portion of an upper edge of the holder 504. To this end, the extension member 710 has an internal fixing part 713 formed by bending the internal edge thereof to thereby be fixed to the outer portion of an upper edge of the holder 504 by a method such as a press-fitting method, an adhesive coupling method, or the like.

Here, the extension member 710' may have a significantly reduced interval between the extension member 710' and a lower surface of the rotating member. That is, the extension member 710' may have a significantly reduced interval between the extension member 710' and a rotor case 302 among components of the rotor 300, which is one of the rotating members.

Since the extension member 710' is a fixed member and the rotor case 302 adjacent thereto is a rotating member, when the rotor case 302 rotates in a state in which the interval between the extension member 710' and the rotor case 302 is significantly reduced, attractive force attracting the rotor case 302 toward the extension member 710' may be generated.

In addition, a portion at which the extension member 710' faces the rotor case 302 provided as the rotating member, may be provided with at least one ring shaped groove 711. In this case, when the rotor case 302 rotates, larger attractive force attracting the rotor case 302 toward the extension member 710' may be generated.

In addition, a portion at which the extension member 710' faces the rotor case 302 provided as the rotating member, may be provided with at least one pumping groove. The pumping groove may have a shape such as a spiral shape, a screw shape, a herringbone shape, or the like. Although not shown, the pumping groove may be provided in the lower surface of the rotating member (the rotor case) facing the extension member 710'.

Meanwhile, the fan motor 1000' according to another embodiment of the present invention may include the washer 506' provided above the bearing 502, wherein the washer 506' serves as a stopper limiting excessive floating of the rotating member (the rotor, the shaft, or the like). In this case, a catching jaw 503 protruded inwardly may be provided on an upper edge of the holder 504 in order to allow the washer 506' to be caught. That is, the washer 506' may be provided between the upper end of the bearing 502 and the catching jaw 503 to thereby limit the excessive floating of the rotating member.

As set forth above, according to the embodiments of the present invention, the attractive force may be provided over the entire rotor, whereby stable rotation of the rotor may be secured. In addition, the rotor may stably rotate, whereby noise or power waste that may be generated at the time of high speed rotation may be prevented.

While the present invention has been shown and described in connection with the embodiments, it will be apparent to those skilled in the art that modifications and variations can be made without departing from the spirit and scope of the invention as defined by the appended claims.

What is claimed is:

1. A base assembly for a motor, the base assembly comprising:
    a holder including a shaft system of the motor mounted therein and a stator for providing rotational driving force to a rotating member;
    an extension member mounted on the holder and extended to an upper portion of an outer edge of the stator in an outer diameter direction; and
    an attractive magnet positioned on an end portion of the extension member in the outer diameter direction and coupled on the extension member so as to face the rotating member to thereby prevent excessive floating of the rotating member.

2. The base assembly of claim 1, wherein the extension member has a significantly reduced interval between the extension member and a lower surface of the rotating member.

3. The base assembly of claim 2, wherein the extension member is provided with at least one ring shaped groove in a portion in which the extension member faces the rotating member.

4. The base assembly of claim 1, wherein the extension member has an interval between the extension member and a lower surface of the rotating member, the interval forming a labyrinth seal.

5. The base assembly of claim 1, wherein the extension member includes the attractive magnet seated on a downwardly stepped portion of an outer edge thereof.

6. The base assembly of claim 1, wherein an outer edge of the extension member has a shape in which only an upper portion thereof corresponding to a portion at which the attractive magnet faces the rotating member is opened.

7. The base assembly of claim 1, wherein the extension member is formed of a magnetic material.

8. The base assembly of claim 1, wherein the extension member includes a yoke provided on an outer edge thereof, the yoke having the attractive magnet seated thereon.

9. The base assembly of claim 8, wherein the yoke is formed of a magnetic material.

10. The base assembly of claim 1, wherein the extension member is fixed to an outer portion of an upper edge of the holder.

11. The base assembly of claim 1, wherein the extension member has a fixing part formed by bending an internal edge thereof to be fixed to an internal portion of an upper edge of the holder.

12. A fan motor comprising:
    a base assembly comprising:
        a holder including a shaft system of the motor mounted therein and a stator for providing rotational driving force to a rotating member;
        an extension member mounted on the holder and extended to an upper portion of the stator; and
        an attractive magnet positioned above the extension member in an outer diameter direction to thereby prevent excessive floating of the rotating member;
    a shaft system of the motor including a bearing, a washer, and a shaft mounted in the base assembly;
    a rotating member including a rotor fixed to an upper end of the shaft and provided to rotate;
    a fan mounted on an outer portion of the rotor; and
    a housing including the base assembly fixed to an internal portion thereof and the shaft system and the rotating member operated in the internal portion thereof,
    wherein the housing includes communication parts provided at upper and lower portions thereof in an axial direction so that a cooling air current passes from one end thereof to the other end thereof by rotation of the spindle motor, the communication parts being in communication with the outside.

13. The fan motor of claim 12, wherein the communication part at the lower portion of the housing is provided along an outer diameter of the base assembly and the communication part at the upper portion of the housing has a shape in which it is opened.

* * * * *